United States Patent
Brandt et al.

(10) Patent No.: US 10,380,032 B2
(45) Date of Patent: *Aug. 13, 2019

(54) MULTI-ENGINE ADDRESS TRANSLATION FACILITY

(71) Applicant: INTERNATIONAL BUSINESS MACHINES CORPORATION, Armonk, NY (US)

(72) Inventors: Uwe Brandt, Boeblingen (DE); Markus Helms, Boeblingen (DE); Christian Jacobi, Poughkeepsie, NY (US); Markus Kaltenbach, Boeblingen (DE); Thomas Koehler, Boeblingen (DE); Frank Lehnert, Boeblingen (DE)

(73) Assignee: INTERNATINOAL BUSINESS MACHINES CORPORATION, Armonk, NY (US)

( * ) Notice: Subject to any disclaimer, the term of this patent is extended or adjusted under 35 U.S.C. 154(b) by 218 days.

This patent is subject to a terminal disclaimer.

(21) Appl. No.: 15/454,243

(22) Filed: Mar. 9, 2017

(65) Prior Publication Data
US 2018/0260336 A1  Sep. 13, 2018

(51) Int. Cl.
*G06F 12/1036* (2016.01)
*G06F 12/1009* (2016.01)
*G06F 9/455* (2018.01)

(52) U.S. Cl.
CPC ...... *G06F 12/1036* (2013.01); *G06F 12/1009* (2013.01); *G06F 2009/45583* (2013.01);
(Continued)

(58) Field of Classification Search
CPC ............ G06F 12/1009; G06F 12/1036; G06F 2009/45583; G06F 2212/1016;
(Continued)

(56) References Cited

U.S. PATENT DOCUMENTS 5,317,705 A * 5/1994 Gannon .............. G06F 12/1036
                                                              718/100
6,349,362 B2 * 2/2002 Luick ................. G06F 12/1063
                                                              711/122
(Continued)

OTHER PUBLICATIONS

Ben-Yehuda et al., "The Turtles Project: Design and Implementation of Nested Virtualization", OSDI'10 Proceedings of the 9th USENIX conference on Operating systems design and implementation, Oct. 4-6, 2010, (14 pages).

(Continued)

*Primary Examiner* — Reginald G Bragdon
*Assistant Examiner* — Aaron D Ho
(74) *Attorney, Agent, or Firm* — William A. Kinnaman, Esq.; Kevin P. Radigan, Esq.; Heslin Rothenberg Farley & Mesiti P.C.

(57) ABSTRACT

An address translation facility is provided for multiple virtualization levels, where a guest virtual address may be translated to a guest non-virtual address, the guest non-virtual address corresponding without translation to a host virtual address, and the host virtual address may be translated to a host non-virtual address, where translation within a virtualization level may be specified as a sequence of accesses to address translation tables. The address translation facility may include a first translation engine and a second translation engine, where the first and second translation engines each have capacity to perform address translation within a single virtualization level of the multiple virtualization levels. In operation, based on the first translation engine performing a guest level translation, the second translation engine may perform a host level translation of a resulting guest non-virtual address to a host non-virtual address based on the guest level translation by the first translation engine.

14 Claims, 15 Drawing Sheets

(52) U.S. Cl.
CPC ............... *G06F 2212/1016* (2013.01); *G06F 2212/1056* (2013.01); *G06F 2212/151* (2013.01); *G06F 2212/651* (2013.01); *G06F 2212/657* (2013.01); *G06F 2212/681* (2013.01); *G06F 2212/684* (2013.01)

(58) Field of Classification Search
CPC ....... G06F 2212/1056; G06F 2212/151; G06F 2212/651; G06F 2212/657; G06F 2212/681; G06F 2212/684
USPC ........................................................ 711/207
See application file for complete search history.

(56) References Cited

U.S. PATENT DOCUMENTS

| | | |
|---|---|---|
| 9,355,033 B2 | 5/2016 | Gschwind |
| 2014/0006681 A1 | 1/2014 | Chen et al. |
| 2016/0246730 A1 | 8/2016 | Gandhi et al. |
| 2016/0246732 A1 | 8/2016 | Shanbhogue et al. |
| 2016/0292075 A1 | 10/2016 | Mohan |

OTHER PUBLICATIONS

Mel et al., "The NIST Definition of Cloud Computing," National Institute of Standards and Technology, Information Technology Laboratory, Special Publication 800-145, Sep. 2011, (pp. 1-7).
Zhang et al., "CloudVisor: Retrofitting Protection of Virtual Machines in Multi-tenant Cloud with Nested Virtualization", Symposium on Operating Systems Principles (SOSP), Oct. 23-26, 2011, (pp. 203-216).
IBM, "z/Architecture Principles of Operation," IBM® Publication No. SA22-7832-10, Eleventh Edition, Mar. 2015, (pp. 1-1732).
IBM, "Power ISA® Version 2.07B," International Business Machines Corporation, Apr. 9, 2015, (pp. 1-1527).
Brandt et al, "Multi-Engine Address Translation Facility", U.S. Appl. No. 15/798,585, filed Oct. 31, 2017 (60 pages).
Brandt et al, List of IBM Patents or Patent Applications Treated as Related, Oct. 31, 2017 (2 pages).

* cited by examiner

MULTI-ENGINE ADDRESS TRANSLATION FACILITY

BACKGROUND

One or more aspects relate, in general, to processing within a computing environment, and in particular, to processing associated with address translation data structures of a virtual environment.

In computing environments that support virtualization technology, an operating system may be running on a virtual machine on a processor that supports multiple levels of address translation tables. In such an environment, the operating system is a guest of a hypervisor also executing in the computing environment.

Further, in such environments, dynamic address translation (DAT) may be performed during a memory reference to translate a virtual address into a corresponding real or absolute address. This translation typically includes a walk, referred to as a page or DAT walk, of multiple levels of address translation tables in order to determine the real address. This is time consuming, and thus, to improve performance for future translation requests, the virtual address to real or absolute address mapping is stored in an entry of a structure associated with address translation, such as a translation look-aside buffer (TLB) or other such structure.

The translation look-aside buffer is a cache used by the memory management hardware to improve virtual address translation speed. The next time translation for a virtual address is requested, the TLB is checked. If the translation is in the TLB, the real or absolute address is retrieved from the TLB. Otherwise, the DAT walk is performed once again.

SUMMARY

Shortcomings of the prior art are overcome and additional advantages are provided through the provision of a computer program product for facilitating processing in a computing environment. The computer program product includes a storage medium readable by a processing circuit and storing instructions for execution by the processing circuit for performing a method. The method includes providing an address translation facility for multiple virtualization levels, where a guest virtual address may be translated into a guest non-virtual address, the guest non-virtual address corresponding without translation to a host virtual address, and the host virtual address may be translated to a host non-virtual address, where translation within a virtualization level is specified as a sequence of accesses to address translation tables. The providing of the address translation facility includes providing a first translation engine, and providing a second translation engine. The first translation engine and the second translation engine each have capacity to perform address translation within a single virtualization level of the multiple virtualization levels. In operation, with the first translation engine performing a guest level translation, the second translation engine may perform a host level translation of a resulting guest non-virtual address to a host non-virtual address based on the guest level translation by the first translation engine.

Computer-implemented methods and computer systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Computing system configurations include physical memory to store applications and data. The amount of physical memory is fixed and often inadequate to support the needs of users. Therefore, to provide additional memory or at least the appearance of memory, a memory management technique, referred to as virtual memory, is utilized. Virtual memory uses virtual addressing, which provides ranges of addresses that can appear to be much larger than the physical size of main memory.

To access main memory in a system configuration that includes virtual memory, a memory access is requested that includes an effective address. The effective or virtual address is translated into a non-virtual address, such as a real or absolute address, which is then used to access the physical memory. Translation is performed using an address translation technique. Several address translation techniques are currently available. In a computing environment with multiple levels of virtualization, the address translation facility typically includes a single complex state machine or engine that translates, for instance, from a guest virtual address to a host non-virtual address. Certain disadvantages arise from the complexity of such a state machine or engine.

In accordance with one or more aspects of the present invention, an address translation facility is provided herein for multiple virtualization levels, where a guest virtual address may be translated to a guest non-virtual address, the guest non-virtual address corresponding without translation to a host virtual address, and the host virtual address may be translated to a host non-virtual address. Translation within a virtualization level may be specified as a sequence of accesses to address translation tables. Advantageously, the same address translation process may be employed on different virtualization levels using multiple basic translation engines. The multiple translation engines may, in one or more embodiments, be identical translation engines, such as multiple instances of the same translation engine. For two levels of virtualizations, two or more translation engines may be used, with each translation engine only spanning one virtualization level, and with the translation engines working together (as described herein) to perform a desired address translation.

For instance, a first translation engine of the multiple translation engines may perform a guest level translation, and a second translation engine of the multiple translation engines may perform a host level translation, including host level translation of an access to each guest address translation table, and to provide host level translation of a resulting guest non-virtual address to a host non-virtual address in a response to the translation by the first translation engine. Further, as noted, the first and second translation engines may have capacity to perform address translation only within a single level of the multiple virtualization levels.

Figure 1A:
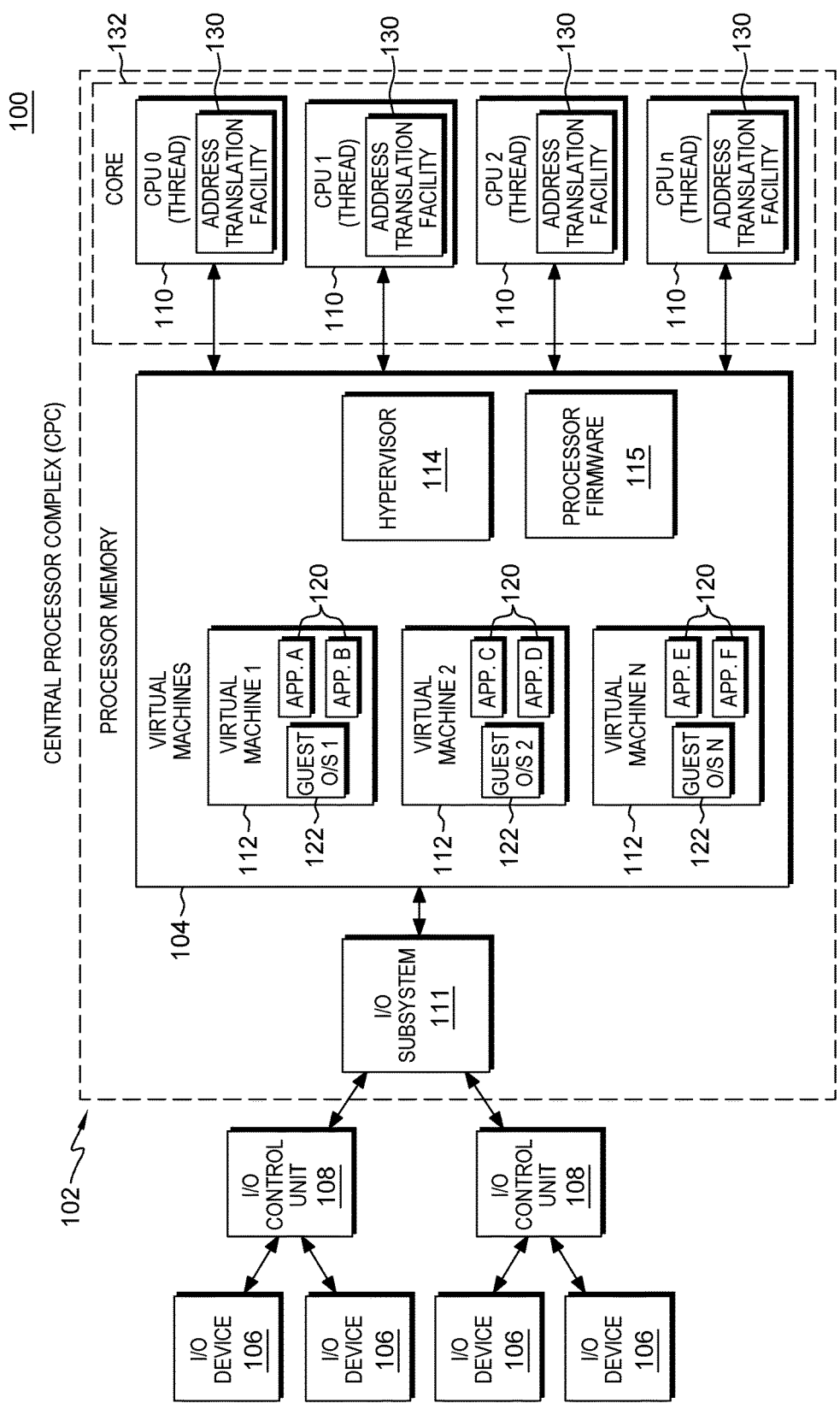
FIG. 1A depicts one example of a virtual computing environment to incorporate and use one or more aspects of an address translation facility, in accordance with an aspect of the present invention.

One example of a computing environment to incorporate and use one or more aspects of an address translation facility is described with reference to FIG. 1A. Referring to FIG. 1A, in one example, a computing environment 100 is based on the z/Architecture, offered by International Business Machines (IBM®) Corporation, Armonk, N.Y. The z/Architecture is described in an IBM Publication entitled "z/Architecture—Principles of Operation," Publication No. SA22-7832-10, 11th Edition, March 2015, which is hereby incorporated by reference herein in its entirety. Z/ARCHITECTURE, IBM, Z/VM and Z/OS (referenced herein) are registered trademarks of International Business Machines Corporation, Armonk, N.Y. Other names used herein may be registered trademarks, trademarks or product names of International Business Machines Corporation or other companies.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

Computing environment 100 includes a central processor complex (CPC) 102 providing virtual machine support. CPC 102 is coupled to one or more input/output (I/O) devices 106 via one or more control units 108. Central processor complex 102 includes, for instance, a processor memory 104 (a.k.a., main memory, main storage, central storage) coupled to one or more central processors (a.k.a., central processing units (CPUs)) 110, and an input/output subsystem 111, each of which is described below.

Processor memory 104 includes, for example, one or more virtual machines 112, a virtual machine manager, such as a hypervisor 114, that manages the virtual machines, and processor firmware 115. One example of hypervisor 114 is z/VM®, offered by International Business Machines Corporation, Armonk, N.Y. The hypervisor is sometimes referred to as the host. Further, as used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

The virtual machine support of the CPC provides the ability to operate large numbers of virtual machines 112, each capable of operating with different programs 120 and running a guest operating system 122, such as Linux. Each virtual machine 112 is capable of functioning as a separate system. That is, each virtual machine can be independently reset, run a guest operating system, and operate with different programs. An operating system or application program running in a virtual machine appears to have access to a full and complete system, but in reality, only a portion of it is available.

Processor memory 104 is coupled to central processors (CPUs) 110, which are physical processor resources assignable to virtual machines. For instance, virtual machine 112 includes one or more logical processors, each of which represents all or a share of a physical processor resource 110 that may be dynamically allocated to the virtual machine. In one or more embodiments, central processor 110 may include an address translation facility 130, such as described herein.

Additionally, in one embodiment, each CPU 110 is a hardware thread executing within a processing core (a.k.a., core) 132. A core includes one or more threads, and in this example, core 132 includes four hardware threads. In other examples, the computing environment may include one or more cores, and each core may include one or more hardware threads.

Further, processor memory 104 is coupled to an I/O subsystem 111. Input/output subsystem 111 directs the flow of information between input/output control units 108 and devices 106 and main storage 104. It is coupled to the central processing complex, in that it can be a part of the central processing complex or separate therefrom.

In this particular example, the model of virtual machines is a V=V model, in which the real or absolute memory of a virtual machine is backed by host virtual memory, instead of real or absolute memory. Each virtual machine has a contiguous virtual memory space. The physical resources are managed by host 114, and the shared physical resources are dispatched by the host to the guest operating systems, as needed, to meet their processing demands. This V=V virtual machine (i.e., pageable guest) model assumes that the interactions between the guest operating systems and the physical shared machine resources are controlled by the host, since the large number of guests typically precludes the host from simply partitioning and assigning the hardware resources to the configured guests.

In one embodiment, the host (e.g., z/VM®) and processor (e.g., System z) hardware/firmware interact with each other in a controlled cooperative manner in order to process guest operating system operations without requiring the transfer of control from/to the guest operating system and the host. Guest operations can be executed directly without host intervention via a facility that allows instructions to be interpretively executed for the guest, including a pageable storage mode guest. This facility provides an instruction, Start Interpretive Execution (SIE), which the host can issue, designating a control block called a state description which holds guest (virtual machine) state and controls, such as execution controls and mode controls. The instruction places the machine into an interpretive-execution mode in which guest instructions and interruptions are processed directly, until a condition requiring host attention arises. When such a condition occurs, interpretive execution is ended, and either a host interruption is presented, or the SIE instruction completes storing details of the condition encountered; this latter action is called interception.

Figure 1B:
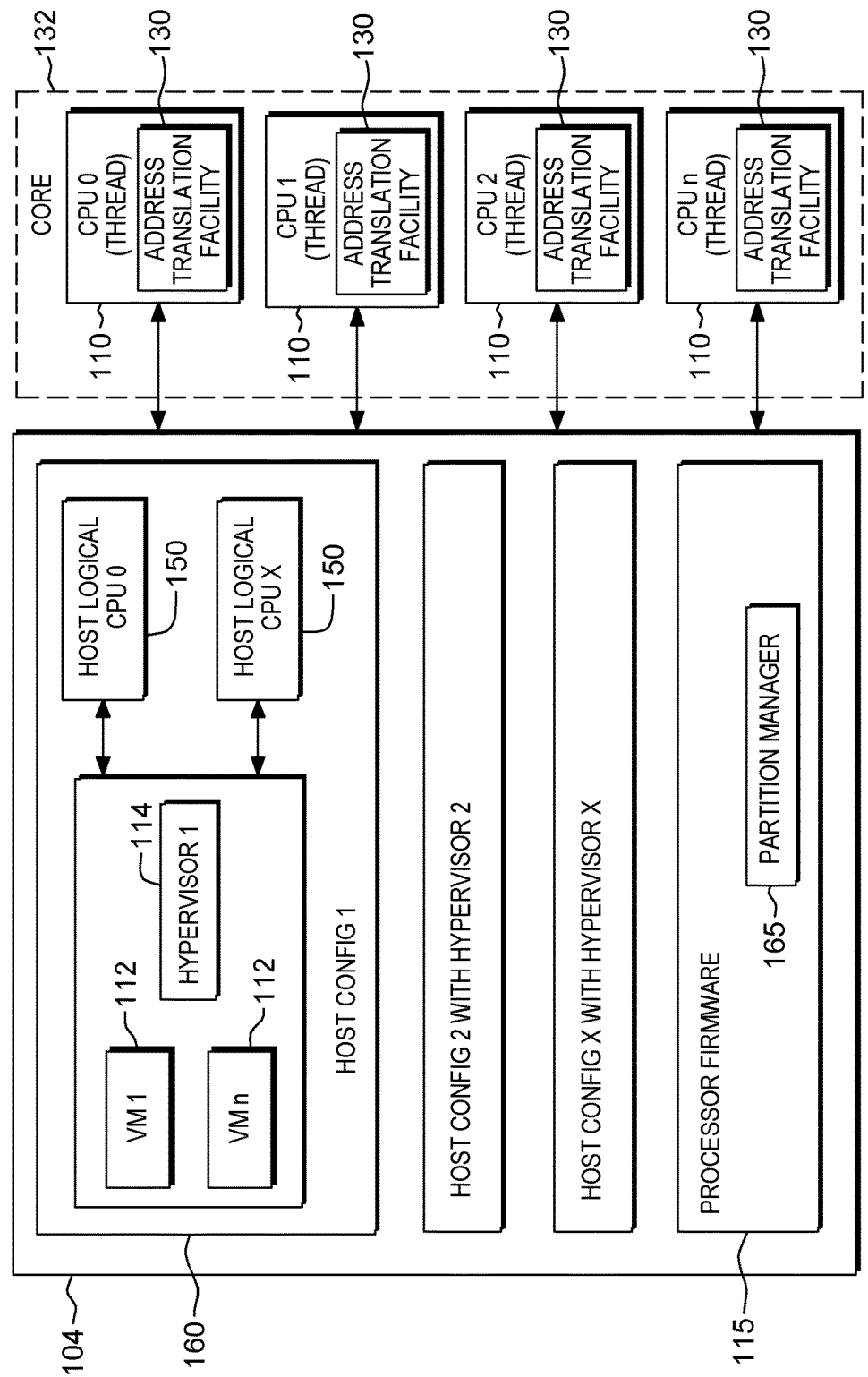
FIG. 1B depicts another example of a virtual computing environment to incorporate and use one or more aspects of an address translation facility, in accordance with an aspect of the present invention.

Another example of a computing environment to incorporate and use one or more aspects of the address translation facility is described with reference to FIG. 1B. In this example, there are multiple host configurations 160, running on the system, each managed by a separate hypervisor 114 and each supporting virtual machines (VM) 112. For each of these host configurations 160, the hypervisor dispatches the virtual machines 112 on host logical processors (a.k.a., host logical CPU) 150. There can be multiple of these logical processors 1 through X. The coordination of these host configurations 160 is done by a partition manager 165, which is part of the processor firmware 115. The hypervisors, virtual machines and partition manager all reside in, e.g., processor memory 104. Partition manager 165 manages dispatch of the host logical processors onto the hardware threads 110, each of which includes address translation facility 130, within a core 132. An example of a partition manager is PR/SM.

Similar to the capabilities provided to each virtual machine 112 (e.g., Linux) by hypervisor 114 (e.g., zVM), partition manager 165 (e.g. PR/SM) provides the ability to operate multiple host configurations each of which is capable of functioning as a separate system. Each host configuration (e.g., zVM instance) appears to have access to a full and complete system, but in reality, only a portion of it is available. For example, it is possible for the total of the number of host logical CPUs supported in host configuration 1 added to the number of host logical CPUs supported in host configuration 2 to exceed the total number of hardware CPUs (threads). The partition manager will share the physical resources between the host configurations transparent to the operating systems running in each configuration.

Figure 2A:
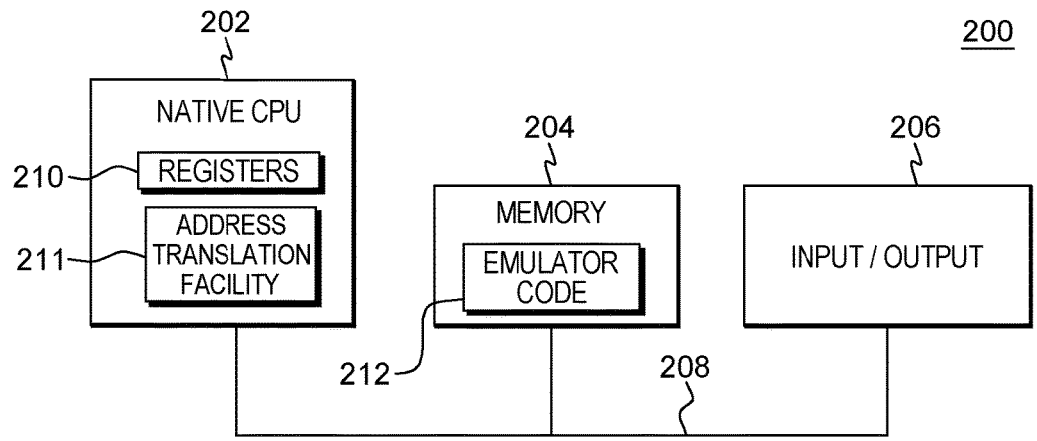
FIG. 2A depicts another example of a computing environment to incorporate and use one or more aspects of an address translation facility, in accordance with an aspect of the present invention.

Yet a further example of a computing environment to incorporate and use one or more aspects of the address translation facility is described with reference to FIG. 2A. In this example, a computing environment 200 includes, for instance, a native central processing unit (CPU) 202, a memory 204, and one or more input/output devices and/or interfaces 206 coupled to one another via, for example, one or more buses 208 and/or other connections. As examples, computing environment 200 may include a z Systems server, a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment, as well as an address translation facility 130. These registers include information that represents the state of the environment at any particular point in time.

Moreover, native central processing unit 202 executes instructions and code that are stored in memory 204. In one particular example, the central processing unit executes emulator code 212 stored in memory 204. This code enables the computing environment configured in one architecture to emulate one or more other architectures. For instance, emulator code 212 allows machines based on architectures other than the z/Architecture, such as PowerPC processors, Power Systems servers, HP Superdome servers or others, to emulate the z/Architecture and to execute software and instructions developed based on the z/Architecture.

Figure 2B:
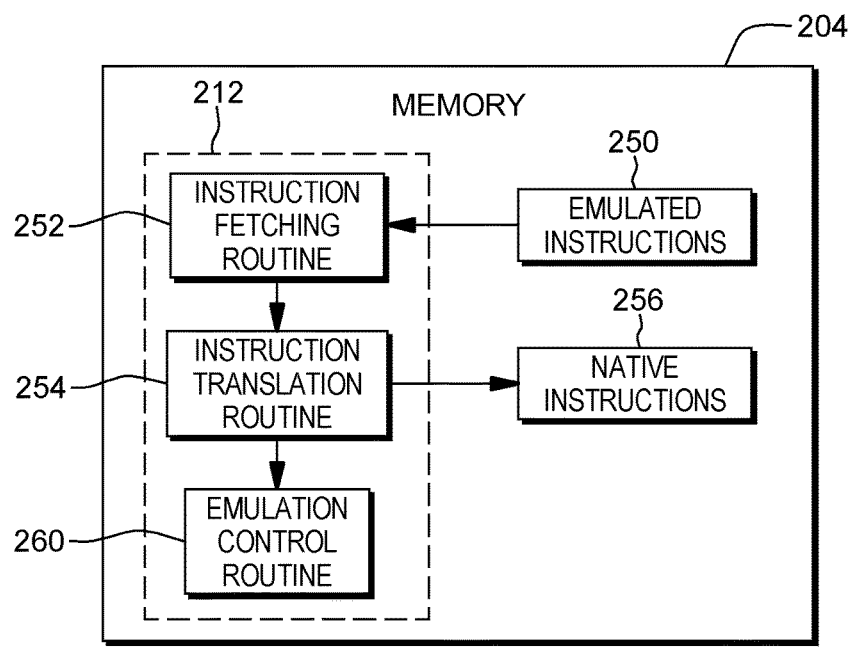
FIG. 2B depicts further details of the memory of FIG. 2A.

Further details relating to emulator code 212 are described with reference to FIG. 2B. Emulated instructions 250 stored in memory 204 comprise software instructions (e.g., correlating to machine instructions) that were developed to be executed in an architecture other than that of native CPU 202. For example, emulated instructions 250 may have been designed to execute on a z/Architecture processor, but instead, are being emulated on native CPU 202, which may be, for example, an Intel Itanium II processor. In one example, emulator code 212 includes an instruction fetching routine 252 to obtain one or more emulated instructions 250 from memory 204, and to optionally provide local buffering for the instructions obtained. It also includes an instruction translation routine 254 to determine the type of emulated instruction that has been obtained and to translate the emulated instruction into one or more corresponding native instructions 256. This translation includes, for instance, identifying the function to be performed by the emulated instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained emulated instructions and, at the conclusion of such execution, return control to the instruction fetch routine to emulate the obtaining of the next emulated instruction or a group of emulated instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, emulated instructions 250, native instructions 256 and emulator code 212 may reside in the same memory or may be disbursed among different memory devices.

The computing environments described herein support architectural functions, such as dynamic address translation (DAT). With appropriate support by an operating system, the dynamic address translation facility may be used to provide to a user a system in which storage appears to be larger than the main storage (a.k.a., main memory) which is available in the configuration. This apparent main storage is referred to as virtual storage, and the addresses used to designate locations in the virtual storage are referred to as virtual addresses. The virtual storage of a user may far exceed the size of the main storage which is available in the configuration and normally is maintained in auxiliary storage (e.g., storage not directly addressable). The virtual storage is considered to be composed of blocks of addresses, called pages. Only the most recently referred to pages of the virtual storage are assigned to occupy blocks of physical main storage (e.g., random access memory (RAM)). As the user refers to pages of virtual storage that do not appear in main storage, they are brought in to replace pages in main storage that are less likely to be needed. The swapping of pages of storage may be performed by the operating system without the user's knowledge.

Moreover, in virtual computing environments, the interpretative execution architecture provides a storage mode for absolute storage referred to as a pageable storage mode. In pageable storage mode, dynamic address translation at the host level is used to map guest main storage. The host has the ability to scatter the real storage of pageable storage mode guests to usable frames anywhere in host real storage by using the host DAT, and to page guest data out to auxiliary storage. This technique provides flexibility when allocating real machine resources while preserving the expected appearance of a contiguous range of absolute storage for the guest.

A virtual machine environment may call for application of DAT multiple times: first at the guest level, to translate a guest virtual address through guest managed translation tables into a guest non-virtual address, and then, for a pageable guest, at the host level, to translate the corresponding host virtual address (i.e., guest non-virtual address) to a host a non-virtual address, such as a host real or absolute address.

A sequence of virtual addresses associated with virtual storage is called an address space, and the dynamic address translation facility may be used to provide a number of address spaces. These address spaces may be used to provide degrees of isolation between users. Such support can include a completely different address space for each user, thus providing complete isolation, or a shared area may be provided by mapping a portion of each address space to a single common storage area. Also instructions are provided which permit a semi-privileged program to access more than one such address space. Dynamic address translation provides for the translation of, for instance, virtual addresses from multiple different address spaces without requiring that the translation parameters in the control registers be changed.

Dynamic address translation is the process of translating a virtual address during a storage reference into the corresponding real or absolute address. Dynamic address translation may be specified for instruction and data addresses generated by the CPU. The real or absolute address that is formed by dynamic address translation, and the absolute address that is then formed by prefixing, in one embodiment, are 64 bits in length. The virtual address may be a primary virtual address, a secondary virtual address, an access register (AR)-specified virtual address, or a home virtual address. The addresses are translated by means of the primary, the secondary, an AR-specified, or the home address space control element (ASCE), respectively. After selection of the appropriate address space control element, the translation process is the same for all of the four types of virtual addresses. An address space control element may be a segment table designation or a region table designation. A segment table designation or region table designation causes translation to be performed by means of tables established by the operating system in real or absolute storage.

In the process of translation when using a segment table designation or a region table designation, three types of units of information are recognized—regions, segments, and pages. The virtual address, accordingly, is divided into four fields. In one example, bits 0-32 are called the region index (RX), bits 33-43 are called the segment index (SX), bits 44-51 are called the page index (PX), and bits 52-63 are called the byte index (BX). The RX part of a virtual address is itself divided into three fields. Bits 0-10 are called the region first index (RFX), bits 11-21 are called the region second index (RSX), and bits 22-32 are called the region third index (RTX), in one embodiment.

Figure 3A:
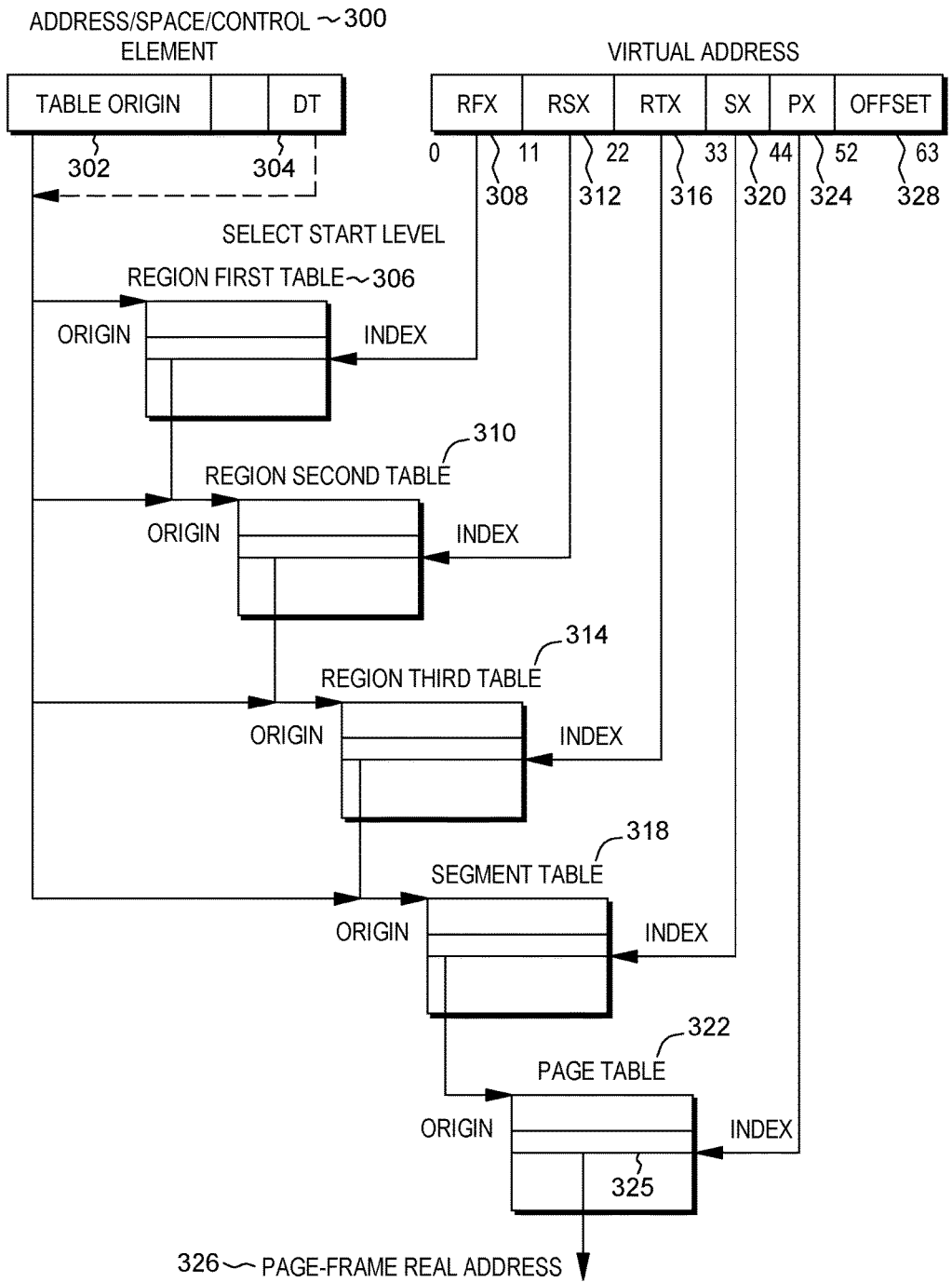
FIG. 3A depicts one example of address translation.

One example of translating a virtual address to a real address is described with reference to FIG. 3A. This process is referred to herein as a DAT walk (or a page walk) in which the address translation tables are walked to translate one address (e.g., a virtual address) to another address (e.g., a real address). In this example, an address space control element (ASCE) 300 includes a table origin 302, as well as a designation type (DT) control 304, which is an indication of a start level for translation (i.e., an indication at which level in the hierarchy address translation is to begin). Using table origin 302 and DT 304, the origin of a particular table is located. Then, based on the table, bits of the virtual address are used to index into the specific table to obtain the origin of the next level table. For instance, if the region first table (RFT) 306 is selected, then bits 0-10 (RFX) 308 of the virtual address are used to index into the region first table to obtain an origin of a region second table (RST) 310. Then, bits 11-21 (RSX) 312 of the virtual address are used to index into region second table 310 to obtain an origin of a region third table (RTT) 314. Similarly, bits 22-32 (RTX) 316 of the virtual address are used to index into region third table 314 to obtain an origin of a segment table 318. Then, bits 33-43 (SX) 320 of the virtual address are used to index into segment table 318 to obtain an origin of page table 322, and bits 44-51 (PX) 324 of the virtual address are used to index into page table 322 to obtain a page table entry (PTE) 325 having a page frame real address (PFRA) 326. The page frame real address is then combined (e.g., concatenated) with offset 328 (bits 52-63) to obtain a real address. Prefixing may then be applied to obtain the corresponding absolute address.

Figure 3B:
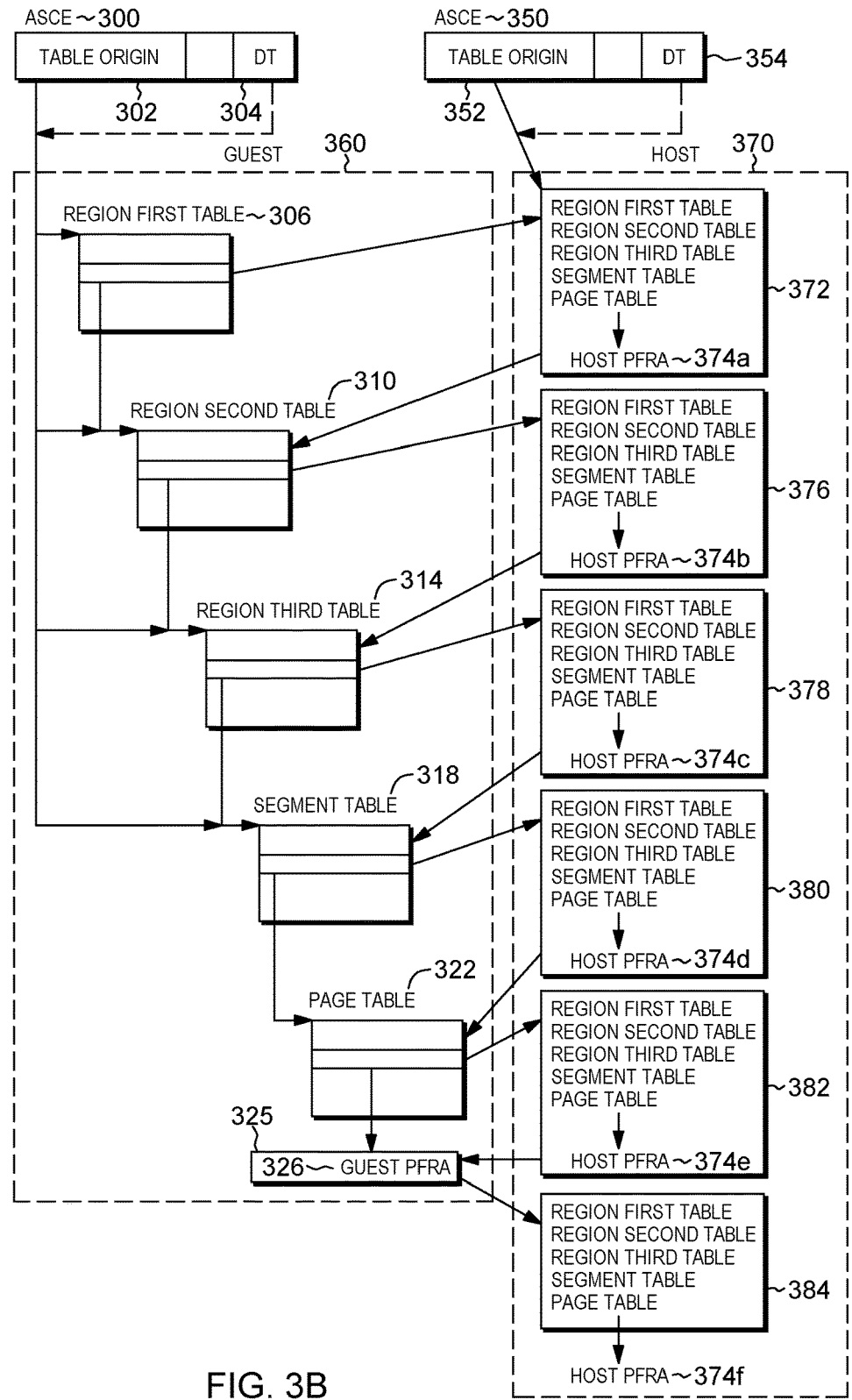
FIG. 3B depicts another example of address translation.

Another example of address translation is described with reference to FIG. 3B. In this example, a DAT walk is performed to translate an initial guest virtual address to a final host real address. In this example, address space control element (ASCE) 300 is a guest address space control element, and DT 304 of ASCE 300 indicates that guest translation determined by guest address translation structures 360 is to start at region first table 306 pointed to by table origin 302. Thus, the appropriate bits of the initial guest virtual address (e.g., RFX 308) are used to index into region first table 306 to obtain a pointer of an entry of the region first table. The address of the region first table entry (RFTE) is a guest real or absolute address. This guest real or absolute address, with the main storage origin and limit applied, corresponds to a host virtual address. This intermediate host virtual address is then translated using host address translation structures 370. In particular, address space control element (ASCE) 350 is a host address space control element used to indicate a start level for translation in host address translation structures 372. Based on the start level (e.g., region first table) indicated by DT 354 of ASCE 350, the particular bits of the host virtual address are used to index into the indicated table with table origin 352 to be used for translation using host address translation structure 372, as described with reference to FIG. 3A. The translation of the host virtual address corresponding to the guest RFTE continues until a host page frame real address (PFRA) 374*a* is obtained.

Data at the intermediate host page frame real address is a pointer to the next level of guest address translation structures (e.g., guest region second table 310, in this particular example), and translation continues, as described above. Specifically, host address translation structures 376, 378, 380 and 382 are used to translate the intermediate host virtual addresses associated with the guest region second table 310, region third table 314, segment table 318 and page table 322, respectively, resulting in host PFRAs 374*b*, 374*c*, 374*d* and 374*e*, respectively. Host page frame real address 374*e* includes the address of a guest page table entry 325. Guest page table entry 325 includes a guest page frame real address 326, which is concatenated with the offset from the initial guest virtual address to obtain the corresponding guest absolute address. The main storage origin and limit are then applied to calculate the corresponding host virtual address, which is then translated, as described above, using address translation structures 384 to obtain host page frame real address 374*f*. The host page frame real address is then combined (e.g., concatenated) with the offset (e.g., bits 52-63) of the host virtual address to obtain the final host real address. This completes translation of a guest virtual address to a host real address.

Although in the above examples translation starts at the region first table, this is only one example. Translation may start at any level for either the guest or the host.

Further, in one embodiment, to improve address translation, a virtual address to real or absolute address translation mapping may be stored in an entry of a structure associated with address translation, such as a translation look-aside buffer (TLB). The TLB is a cache used by the memory management hardware to improve virtual address translation speed. The next time translation for a virtual address is requested, the TLB will be checked and if it is in the TLB, there is a TLB hit and the real or absolute address is retrieved therefrom. Otherwise, a page walk is performed, as described above.

Figure 3C:
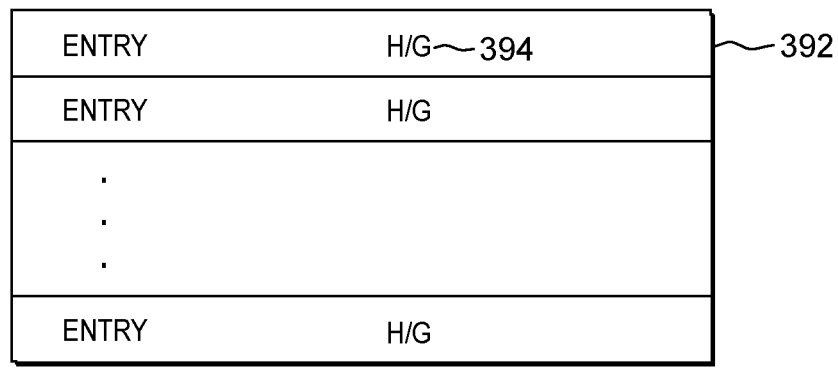
FIG. 3C depicts one example of a translation look-aside buffer, in accordance with an aspect of the present invention.

In one example, as depicted in FIG. 3C, a translation look-aside buffer 390 may include one or more entries 392. An entry may be for a host or for a guest of the computing environment, and may be marked as such with an indicator (e.g., H/G indicator 394). For instance, if H/G 394 is set to one, then it is a host entry, and if set to zero, it is a guest entry. Further, an entry may be associated with a page table entry, a region table entry or a segment table entry of the address translation tables. Many implementations of a translation look-aside buffer are possible.

As indicated, guest translations may be included in the TLB. These entries may be composite guest/host entries which implicitly include one or more host translations. For example, a guest virtual TLB entry may buffer the entire translation from the initial guest virtual address down to the final host real or absolute address. In this case, the guest TLB entry implicitly includes all intermediate host translations 372, 376, 378, 380 and 382, as well as the final host translation 384, as described in FIG. 3B above. In another example, a hierarchical TLB may contain an entry in a first level of the TLB which buffers a translation from the initial guest virtual address down to the associated origin of the guest page table 322. This first level entry represents, for instance, a combined region and segment table entry (CRSTE) and may be referred to as the CRSTE portion of the TLB. Further, the hierarchical TLB may contain a separate entry from a second level of the TLB which buffers the translation from the guest page table entry address down to the final host real or absolute address. In this example, guest entries in the first level of the TLB implicitly include intermediate host translations 372, 376, 378 and 380 which correspond to the host translations which back guest region and segment tables, and guest entries in the second level implicitly include intermediate host translation 382 which backs the guest page table and final host translation 384, as described in FIG. 3B. Many implementations of a translation look-aside buffer are possible.

Generally stated, disclosed herein are computer program products, computer systems and computer-implemented methods which provide an address translation facility across multiple virtualization levels, where a guest-virtual address may be translated to a guest non-virtual address, the guest non-virtual address corresponding without translation to a host virtual address, and the host virtual address may be translated to a host non-virtual address. The translation within a level is specified as a sequence of accesses to address translation tables. Providing the address translation facility may include providing a first basic translation engine, for instance to perform a guest level translation, and providing a second basic translation engine, for instance, to perform a host level translation (in support of the first translation engine). The second translation engine may perform host level translation of an access to each guest address translation table, and may provide host level translation of the resulting guest non-virtual address to a host non-virtual address in response to a translation by the first translation engine. The first translation engine and the second translation engine each have capacity to perform address translations within a single virtualization level of the multiple virtualization levels.

In one or more embodiments, where the first translation engine performs the guest level translation, the second translation engine may further perform a host level translation for the first translation engine of an access to a guest address translation table by the first translation engine.

Further, in one or more embodiments, where the first translation engine performs the guest level translation, the second translation engine may operate transparently to the first translation engine as a child translation engine of the first translation engine.

Where the first translation engine performs the guest level translation, one or more table fetches to a table cache may be sent as guest non-virtual addresses, and based on a table fetch miss in the table cache, a lookup request may be generated for translation the respective guest non-virtual address to a host non-virtual address, with the lookup request being sent to a table lookaside buffer for resolutions. The second translation engine may be engaged to perform the translating of the respective non-virtual guest address to the host non-virtual address based on a table lookaside buffer miss.

In one or more embodiments, the address translation facility further includes writing a translation result of the second translation engine performing the translating of the respective guest non-virtual address to host non-virtual address to the table lookaside buffer, and respinning the lookup request to the table lookaside buffer. As used herein, 'respinning' refers to reasserting the request. Further, the address translation facility may include resolving, based on the respinning the lookup request using the translation result written to the table lookaside buffer, and writing the result for the translating of the respective guest non-virtual address to the host non-virtual address to the table cache, and returning the translation result to the first translation engine.

In one or more implementations, the first translation engine and the second translation engine may be identical translation engines, and either the first translation engine or the second translation engine may perform the guest level translation, and the other of the first and second translation engines may perform the host level translation.

In one or more implementations, the address translation facility may further include a table cache to receive table fetch requests from the first translation engine and the second translation engine. Further, an exception detected by one of the first and second translation engines is propagated to the other of the first and second translation engines through the table cache as a table fetch exception.

Figure 4:
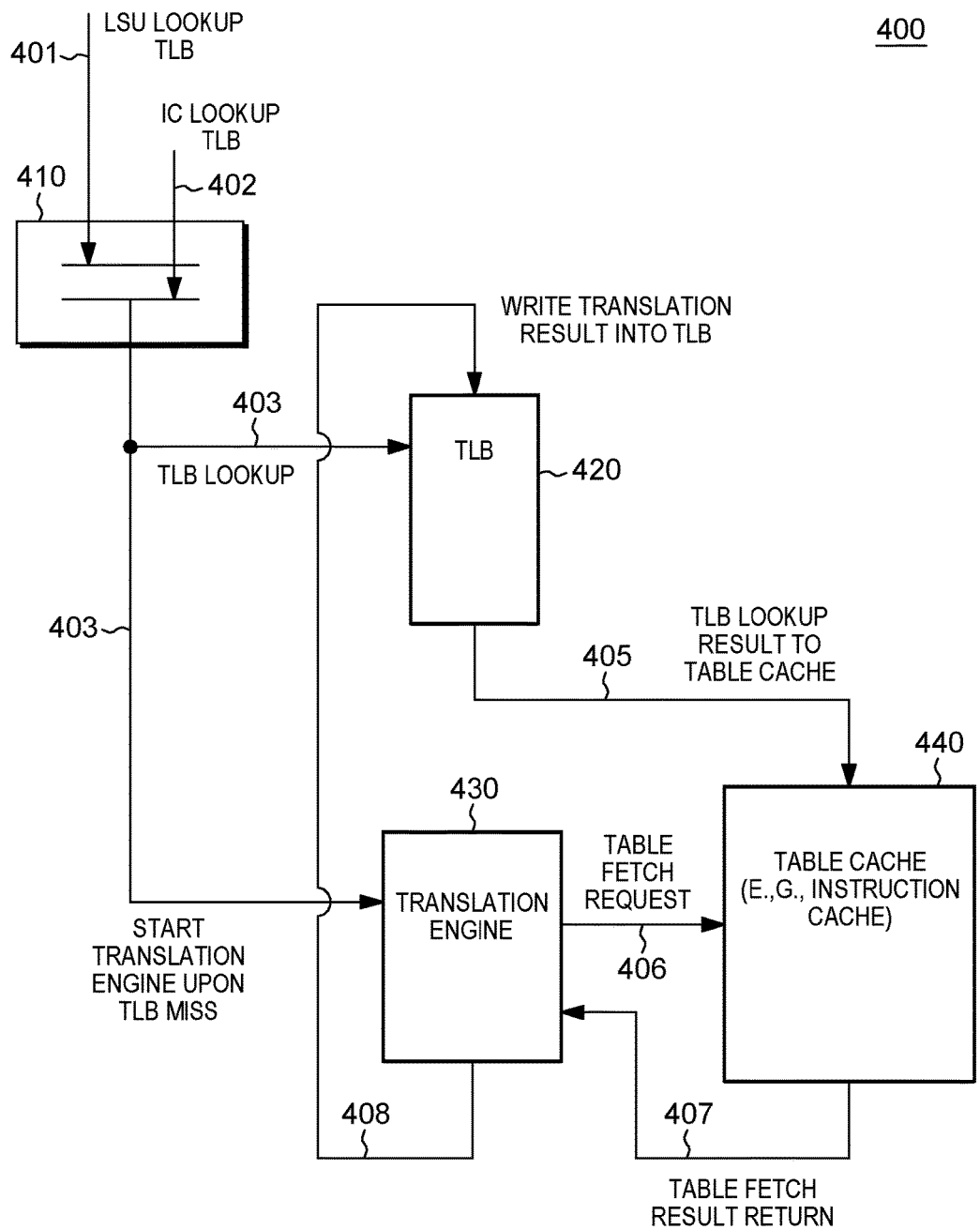
FIG. 4 depicts one embodiment of an address translation facility with a single translation engine, which may be replicated, in accordance with one or more aspects of the present.

Prior to describing the address translation facility further, FIG. 4 depicts one embodiment of an address translation facility 400 with a single translation engine, which may be used in a computing environment lacking virtualization. As illustrated, address translation facility 400 includes an input multiplexer 410, which multiplexes translation requests including, for instance, load store unit (LSU) look up requests to TLB 401 and instruction cache (IC) lookup requests to TLB 402 (where the table cache is implemented within the instruction cache). A selected TLB lookup request 403 is forwarded to a translation lookaside buffer (TLB) 420, as well as to the single translation engine 430. The TLB request initiates or starts translation engine 430 upon a TLB miss based on the TLB lookup request 403. Note that if there is a TLB hit, then the TLB lookup result 405 is written to, for instance, a table cache 440, which (as noted) may reside in the instruction cache. Assuming that there is a TLB miss, then translation engine 430 processes the lookup request and, in doing so, may send table fetch requests 406 to table cache 440, which returns fetch results 407. Translation engine 430 writes the translation result 408 into TLB 420 so that with the next selecting of the initiating TLB lookup request, the translation result will be within TLB 420, resulting in a request hit.

Figure 5:
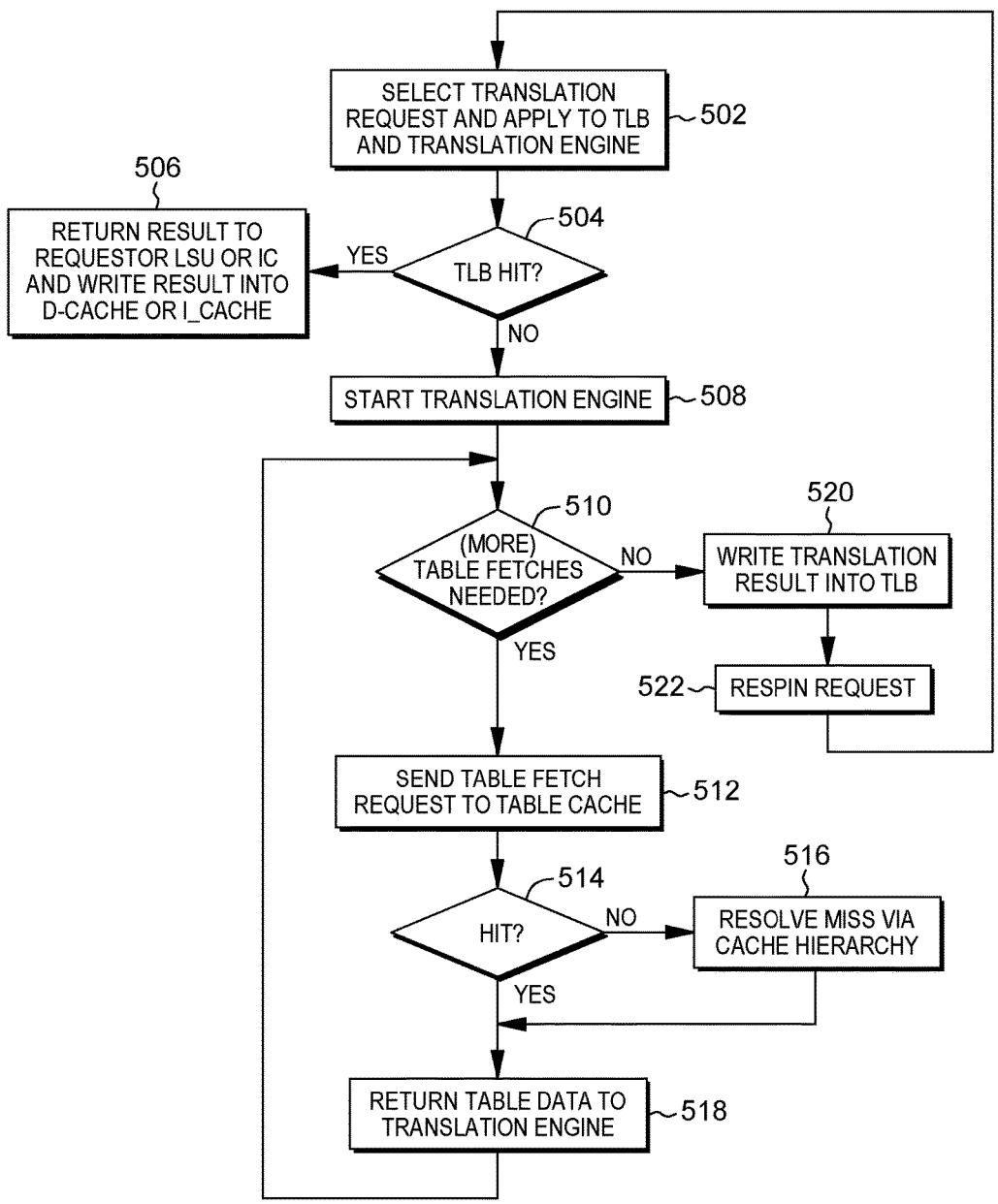
FIG. 5 depicts one embodiment of an address translation process using the single translation engine embodiment of FIG. 4.

FIG. 5 depicts an operational example of address translation using an address translation facility such as depicted in FIG. 4. Referring collectively to FIGS. 4 & 5, a translation/lookup request is initially selected, for instance, via input multiplexer 410, and applied 502 to the translation lookaside buffer (TLB) 420, as well as to the translation engine 430. Processing determines whether there is a TLB hit 504, and if yes, the translation request result is returned to the requesting load store unit (LSU) or table cache (e.g., within the instruction cache), and the result is written into the table cache (or data cache) 506.

Assuming that there is a TLB miss, then translation engine 430 is started 508, and the translation engine determines whether a table fetch is needed 510. For instance, in a real translation, a table fetch may not be required, but in most cases, a table fetch may be needed to look at one or more translation tables. Depending on the type of translation and the type of table entries, the translation engine 430 may need to do a certain amount of table fetches, also depending on the table translation itself. Assuming that a table fetch is required, then the translation engine sends the table fetch request to the table cache 516 and the cache determines whether there is a hit 514. If no, then the table fetch request miss is resolved via the cache hierarchy 516 using conventional processing. Otherwise, the table data is returned to the translation engine 518, which (as noted) is implementing the translation algorithm, and based thereon determines whether another table fetch is required. Once all table fetchs have been received, then the translation engine obtains a result of the translation request. Once the engine finds the result of the address translation request, the result is written into the translation lookaside buffer 512, and the next time the initiating translation request is selected by the input multiplexer, the result is available in the translation lookaside buffer (TLB) and the request is satisfied.

As noted, in one or more aspects, provided herein is an address translation facility which provides address translation across multiple virtualization levels. As explained, a processor subsystem may be equipped with a specialized engine (such as a hardware engine) for translating virtual addresses to non-virtual addresses (e.g., real or absolute addresses). These address translations may be buffered in a second level translation lookaside buffer, referred to herein as TLB2. TLB2 is closely connected to the translation engine, so that address translations calculated once by the translation engine can be stored in TLB2 for later reuse. This processor subsystem has virtualization support implemented, so that multiple guest operating systems can run on virtual processors under a hypervisor system on a single physical host processor. For the address translation engine, this implies the requirement to perform nested address translations spanning the guest level as well as the host level in order to map a guest virtual address to a host non-virtual address, as discussed herein.

In general, each translation step may start with a table origin address (TO) and a table index (TX). A prefix operation may be applied on TO, and then TX and the memory relocation origin may be added to TO. The result of these operations may either be the final translation result, or be used as a memory address to fetch the TO of the next level of address tables. The translation tables may reside in the system cache memory hierarchy, which is referred to herein as the table cache. The table cache can be efficiently implemented through the instruction cache infrastructure, which from its nature is a fetch-only cache.

For a guest level address translation this means that the guest virtual address is translated to a guest non-virtual address by means of the guest level translation tables. The guest non-virtual address is then treated as a host virtual address and translated to the host non-virtual address through the host level translation tables. All guest level table fetches may be performed with guest non-virtual addresses, which must be translated to host non-virtual addresses, before the respective table data can be fetched through the cache/memory hierarchy. As noted herein, a translation engine for guest and host level translations is typically a complex engine with many internal states controlling the translation process. This complexity may make the engine slow, and difficult to verify, as well as to maintain.

Described herein is an address translation facility which (in one or more embodiments) uses multiple instances of a basic translation engine, rather than a complex translation engine for performing guest/host level translations. The basic translation engine only needs to have the capacity to perform address translation for a single virtualization level (e.g., from guest virtual to guest non-virtual or from host virtual to host non-virtual), similar to the translation facility described above in connection with FIGS. 4 & 5.

A translation request for one of the basic translation engines may have associated therewith all parameters needed to fully qualify the translation process (e.g., initial TO, memory relocation origin, etc.). This works similarly for host level, as well as for guest level address translations. Host level translations perform table fetches with host-non-virtual addresses in the traditional way.

In the case of guest level translations, the table fetches are sent to the table cache as guest non-virtual or host virtual addresses, which is a new requirement of a translation facility such as described herein, that is, compared to traditional implementations. However, since the table cache may be implemented through the instruction cache infrastructure, this requirement matches the capabilities of the infrastructure. The table cache will perform a lookup operation in order to establish whether it has the required data already available (i.e., a hit). If that is true, then the table data will be returned to the requesting translation engine. If the table fetch does not hit in the table cache, this data must be obtained through the cache/memory hierarchy, and a lookup request for translating the host virtual table fetch address to the host non-virtual address is sent to the TLB2/translation engine. If this lookup request does not hit in the TLB2, then another translation engine will be engaged to perform that address translation and the respective translation result will be written into TLB2. From TLB2, the result can be retrieved by the table cache, which will now have the required information available to complete the original table fetch based on a host virtual address. This processing is all transparent to the original guest level translation engine, which may be referred to as a "parent engine", while the engine for the host virtual address translation for the guest level table fetch address may be designated a "child engine".

As noted, engagement of a child engine happens through host virtual table fetches of the parent engine. There is however, one situation where engagement of the child engine is not related to a table fetch. In particular, when the parent engine has proceeded with its address translation until the final guest non-virtual address as a result of the last guest level table fetch, then this address is a guest non-virtual address or host virtual address, which still needs to pass through a host level translation to finally obtain the required host non-virtual address as a result of an end-to-end translation from a guest virtual to a host non-virtual address. This final host translation may be referred to herein as the "last-host-translation".

In order to allow a parent engine to obtain the result of the last-host-translation, the parent engine has the capability to perform a TLB2 lookup based on the final result of a guest translation as guest non-virtual (or host virtual) address. If there is a hit in TLB2 found in this request lookup, then the result can be directly forwarded to the parent engine as the final translation result. Otherwise, another translation engine is engaged upon a TLB2 miss, which performs the last-host-translation, and then forwards the result to the parent engine.

Note that the requirement of engaging a child engine as a prerequisite for a parent engine to complete its translation process imposes a restriction on the assignment of engines to translation requests. A situation where all available translation engines are simultaneously assigned as parent engines would potentially be a hang scenario, because none of the parent engines could ever complete without engagement of a child engine. Thus, translation engine assignment should be controlled such that at any time at least one engine is not assigned as a parent engine.

As described herein, address translations across two or more virtualization levels can be efficiently performed with a minimum of two instances of a basic translation engine, each of which has the capacity for translations of only a single virtualization level. Advantageously, design verification and maintenance of a basic translation engine requires less effort than required for a more complex single translation engine for multiple virtualization levels. Also, better translation performance can be achieved with a basic engine since the design can be pipelined and optimized for a smaller set of requirements.

Figure 6:
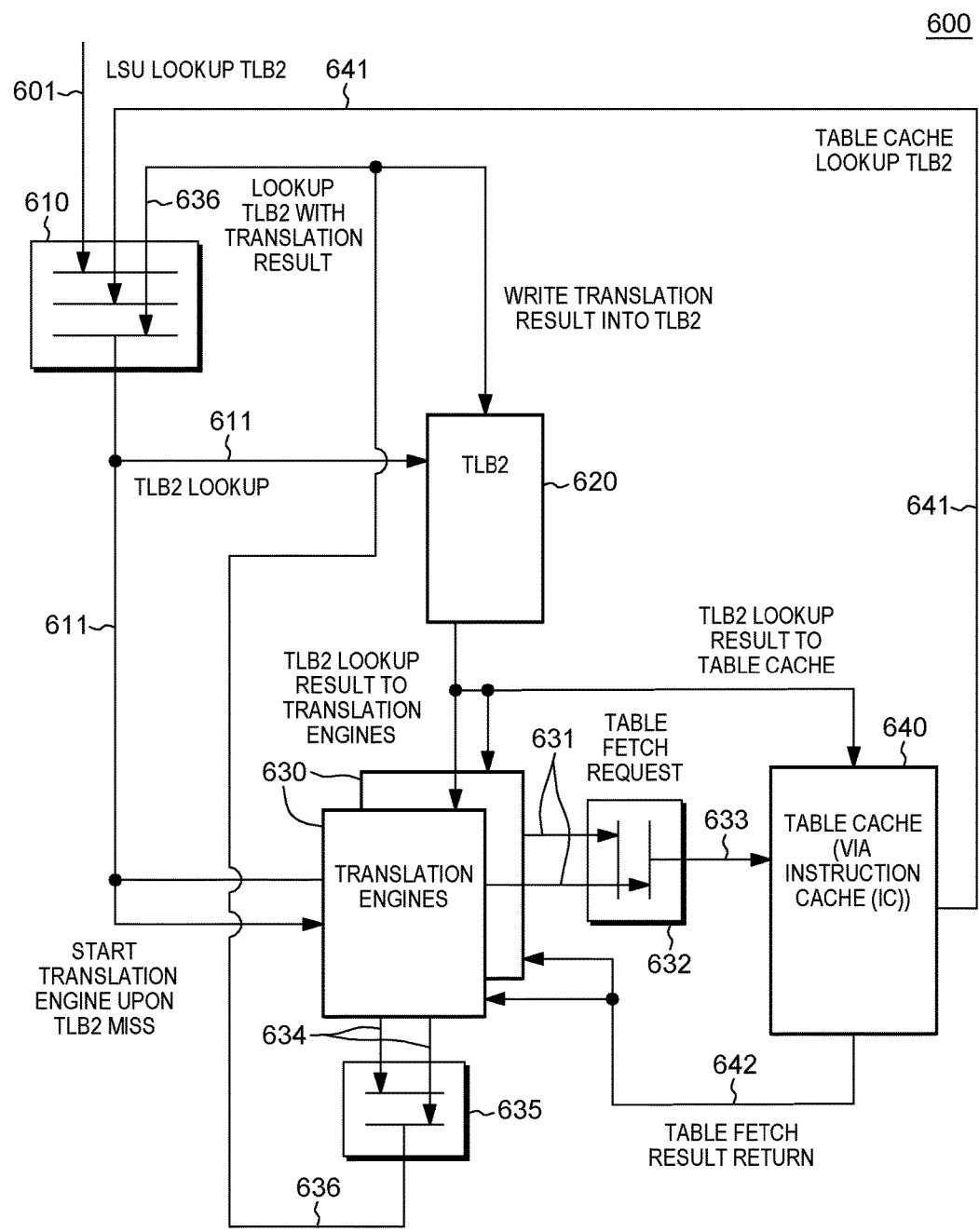
FIG. 6 depicts one embodiment of an address translation facility with multiple translation engines, in accordance with one or more aspects of the present invention.

FIG. 6 depicts one embodiment of an address translation facility 600 with two or more translation engines, in accordance with one or more aspects of the present invention. Address translation facility 600 may be used, as described herein, in connection with a computing environment having multiple virtualization levels including, for instance, a host level virtualization and a guest level virtualization. As illustrated, address translation facility 600 includes an input multiplexer 610, which multiplexes translation requests including, for instance, load storage unit (LSU) lookup requests to TLB2 601, TLB2 lookup requests with translation result 636, and table cache lookup requests to TLB 641. A selected TLB lookup request 611 is forwarded to translation lookaside buffer (TLB2) 620, where TLB2 indicates a translation lookaside buffer for a multi-virtualization environment. The selected TLB lookup request 611 is also forwarded to the two or more translation engines 630, which as discussed herein, can be (in one or more embodiments) identical instances of a translation engine. The TLB request initiates or starts one of the translation engines 630 upon a TLB2 miss based upon the TLB lookup request 611. If there is a TLB hit, then the TLB lookup result 621 may be written to, for instance, a table cache 640, which in one embodiment may reside within an instruction cache. Depending on where in processing the address translation facility is, the TLB lookup result may also be written to one or more of the address translation engines 630. Assuming a TLB miss, then one of the translation engines 630, a first translation engine, may send table fetch requests 631 to table cache 640 via a table fetch request multiplexer 632, and the table cache 640 returns table fetch results 642. As explained herein, the first translation engine may directly write translation results 636 to TLB2, or may initiate one or more TLB2 lookup requests with translation results 636 being sent to TLB2 620, as well as to input multiplexer 610, as described herein. The translation result 634 of translation engine 630 may be forwarded via an output multiplexer 635 as the TLB2 lookup request with translation results 636.

Figure 7A:
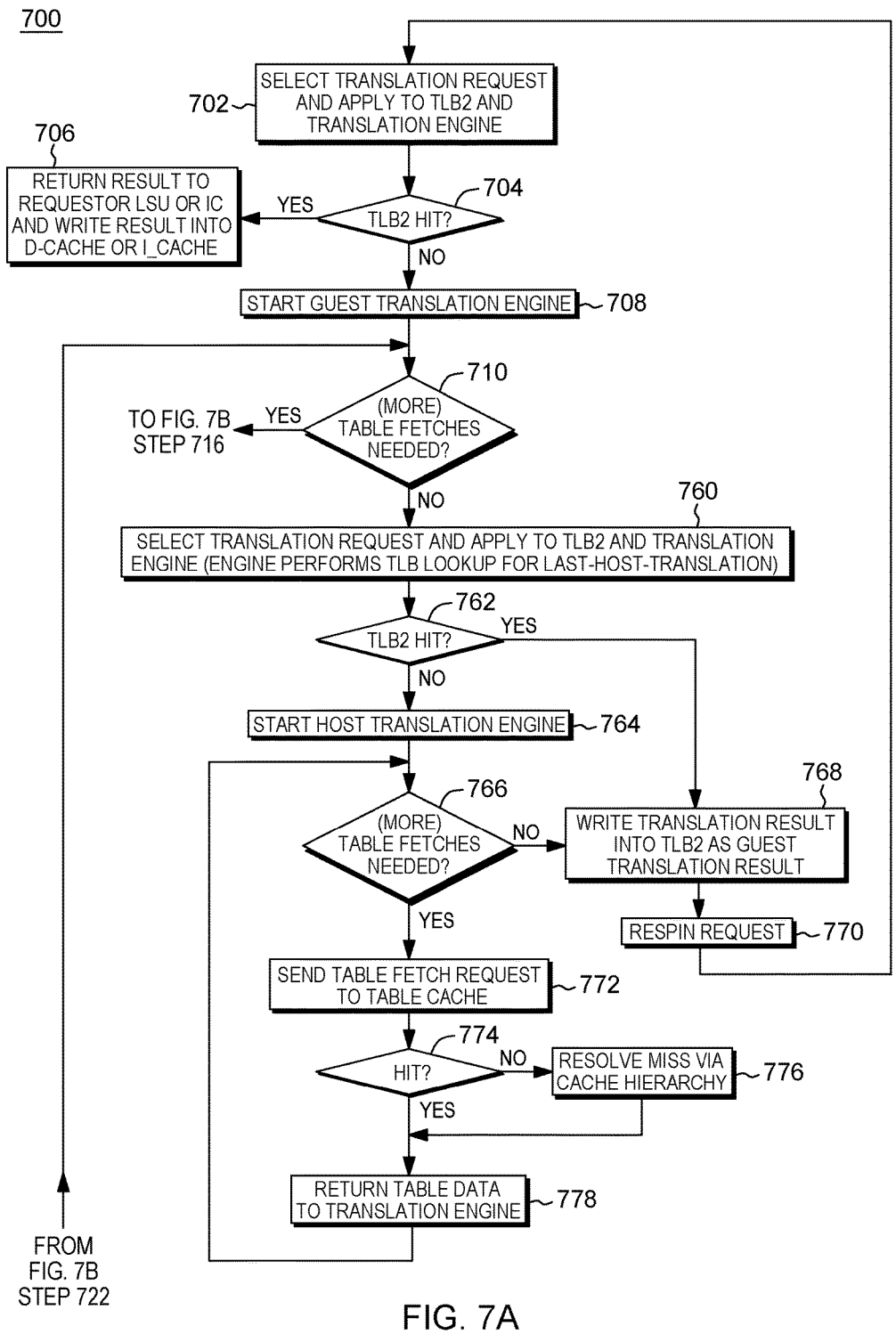
FIGS. 7A-7B depict one embodiment of an address translation process in a multi-virtualization environment using an address translation facility with multiple translation engines, such as depicted in FIG. 6, in accordance with one or more aspects of the present invention.
Figure 7B:
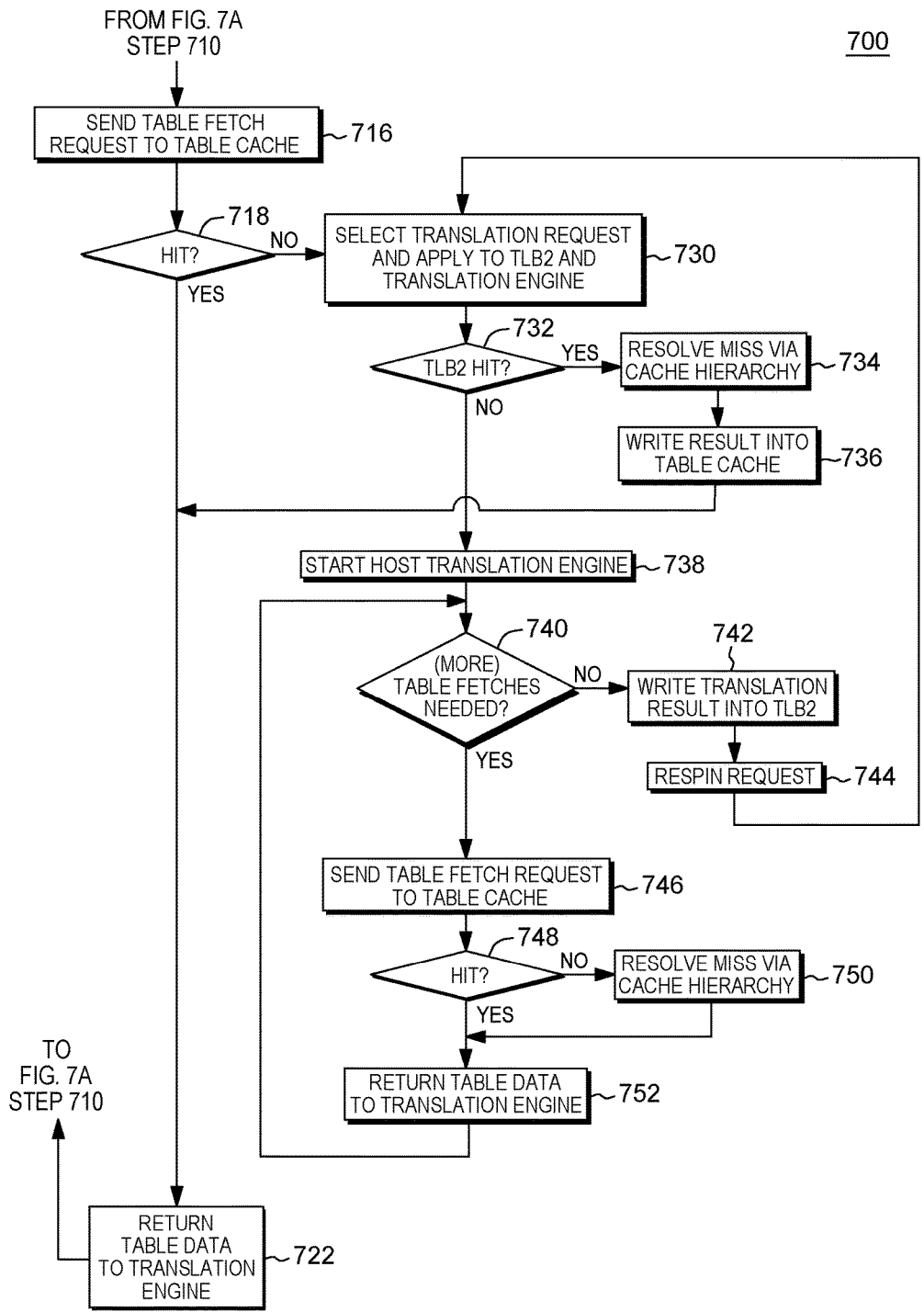

FIGS. 7A & 7B depict and operational example of an address translation facility such as depicted in FIG. 6, in accordance with one or more aspects of the present invention. Referring collectively to FIGS. 7A & 7B, a translation lookup request is initially selected, for instance, via the input multiplexer, and applied 702 to the translation lookaside buffer (TLB2), as well as to the translation engines. The translation lookaside buffer (TLB2) determines whether there is a hit based on the lookup request within the buffer 704, and if yes, then the translation request result is returned to the requestor, and the translation result is written into the table cache, i.e., the data cache, or instruction cache 706.

Assuming that there is a TLB miss, then a first translation engine is started 708, and the first translation engine determines whether a table fetch is needed 710. In most cases, one or more table fetches may be required to look at one or more translation tables depending on the type of translation and the type of table entries, the first translation engine may need to do a certain amount of table fetches, also depending on the table translation itself. Assuming that a table fetch is required, then the translation engine sends the table fetch request to the table cache 716, and the cache determines whether there is a hit. If no, then the table fetch request miss results in the translation facility selecting a corresponding translation request and applying the request to the TLB2, as well as to a second translation engine 730. The translation lookaside buffer (TLB2) determines whether there is a TLB hit 732, and if yes, then resolves the table cache miss via the cache hierarchy 734 using conventional processing. If there is a TLB2 miss 732, then the request is to be resolved using a second translation engine. Once resolved, the address translation request result is written into the table cache 736, and the table cache result is returned to the first translation engine 722.

Remaining with the second translation engine processing, assuming that there is a TLB miss from inquiry 732, then the second translation engine is started 738 and the second translation engine determines whether a table fetch is needed 740. Again, depending on the type of translation and the type of table entries, the second or child translation engine may need to do a certain amount of table fetches. Assuming that a table fetch is not required, then the translation result is written into the translation lookaside buffer (TLB2) 742, and the respective table fetch request of the first translation engine is respun 744 which, in the next selected pass, will result in a translation lookaside buffer (TLB2) hit, and resolving of the fetch request.

Assuming that a table fetch is required, then the table fetch request is sent to the table cache 746 and the cache determines whether there is a hit 748. If no, then the table fetch request miss is resolved via the cache hierarchy 750 using conventional processing. Otherwise, the table data is returned to the second translation engine 752, which based on the translation algorithm, determines whether another table fetch is required 740.

Once the translation result is returned from the second translation engine, then the table cache data is returned to the first translation engine 722, which then determines whether one or more additional table fetches are required 710.

Assuming that no additional table fetches are required by the first translation engine, then a final guest non-virtual address has been obtained which needs to be translated to a host non-virtual address in a last host translation process. This process begins with the first translation engine, that is, the translation engine performing guest translation, performing a translation lookaside (TLB2) lookup for the last host translation. In particular, a translation request is selected and applied to the TLB2, as well as to the second translation engine 760. Processing determines whether there is a TLB2 hit 762, and if yes, then the translation result is written into the translation lookaside buffer (TLB2) as a guest translation result 768, and the initial translation request is respun 770 to be processed.

Assuming that there is a TLB 2 miss 762, then the second translation engine is started 764 to facilitate performing the last host translation. Processing determines whether one or more table fetches are required 766. If no, then the translation result is written into the TLB2 as a guest translation result 768, and the initial translation request is respun for processing 770. Assuming that the second translation engine requires one or more table fetches, then a table fetch request is sent to the table cache 772, which determines whether there is a table cache hit 774. Assuming that there is a table cache hit, then the table data is returned to the second translation engine 778. Otherwise, the table cache miss is resolved by the cache hierarchy 776 using conventional processing.

In a configuration of recursively operating translation engines such as described herein, one or more exceptions may be detected by either the guest level translation engine or the host level translation engine. If the guest level translation engine (also referred to herein as the parent engine) detects an exception, it could simply complete its operation, and does not need to notify the host level translation (also referred to herein as a child translation engine), since the child engine must have completed its operation successfully before the table fetch data, for which it has actually been engaged, could be returned to the parent engine. So the child engine can complete independently. However, completion of the parent engine depends on successful completion (i.e., no exception) of the child engine. If the child engine detects an exception and completes, the parent engine could be in a hang situation. With identical or similar instances of translation engines as described herein, there may be no way using the engines themselves to communicate this condition.

One solution would be to, for instance, establish a direct protocol interface between the parent and child translation engines, which would allow the child engine to notify the parent engine of the occurrence of an exception, which can then terminate its operation as well. Such a solution, however, adds substantial complexity, since there are multiple translation engines available, and each engine is able to operate as either a parent engine or child engine at any given time. This would also defeat the concept described herein of independent translation engines operating recursively.

Disclosed herein is a process or protocol for child exceptions in recursively operating translation engines to be reported to the parent engine via available interfaces and protocols between the translation engines and the table cache. If the child translation engine detects an exception, it completes and reports the exception to the requestor, which in the case of the recursively operating translation engine, will be the table cache. As described, the table cache may be implemented through an instruction cache, and the exception may be reported on a regular interface of the instruction cache. The table cache is then aware of the exception, and that this translation request was actually a child translation for resolving a table cache miss of the respective parent engine, and sends the exception condition back to the parent engine on an existing interface for exceptions detected by the table cache. This interface is already capable of indicating conditions such as "uncorrectable error (UE)" and "address not configured". In accordance with one or more aspects of the present invention, the interface is enhanced or modified by another code point, representing the condition "exception detected during child engine translation". When the parent engine detects this table fetch exception, it completes its operation and notifies the requestor that an exception has occurred.

More particularly, in traditional address translation processing, if a translation engine detects an exception during the translation process, then it completes its operation and notifies the requestor of the occurrence of an exception. No translation lookaside buffer writing occurs in this case. Exception conditions could be invalid or incomplete initial request parameters, invalid translation table entries, address violations of table fetch addresses or of final translation result. While most of these conditions are detected by the translation engine itself, there are also certain exception conditions, which are detected only by the table cache trying to access a translation table entry. As noted, the reasons for such type of exceptions could be uncorrectable error (UE) or table fetch address not configured in cache/memory hierarchy. These types of exceptions are detected by the table cache and reported to the translation engine at the end of a table fetch instead of returning a translation table entry as a translation result. The translation engine then completes its operation, and notifies the requestor the same way as it does for other exception types.

Figure 8:
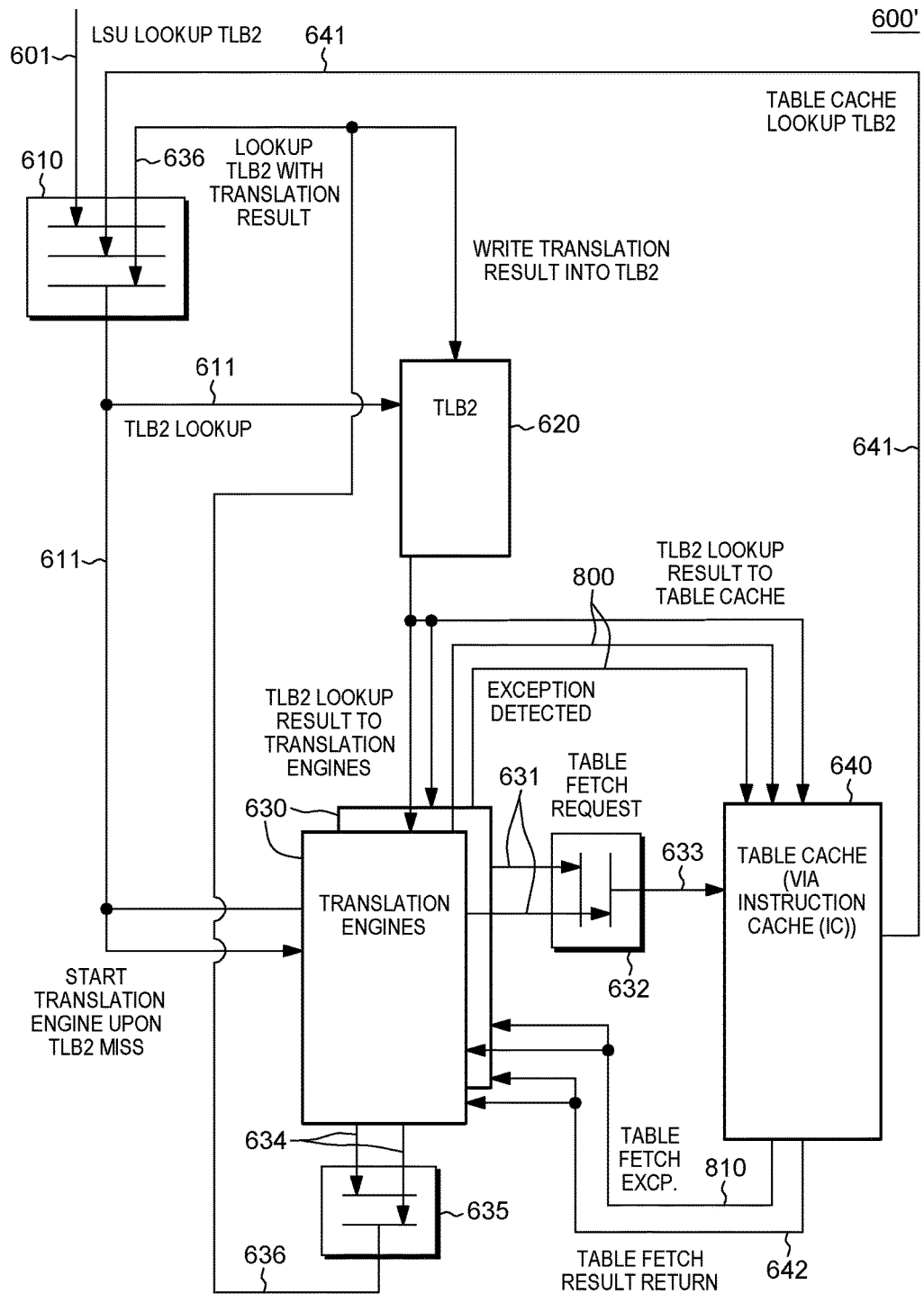
FIG. 8 depicts an example of an address translation facility with exception reporting, shown as a variation on the address translation facility of FIG. 6, in accordance with one or more aspects of the present invention.

In a configuration of recursively operating translation engines, such as discussed herein, exceptions may be detected by either the guest level engine or by the host level engine. As noted, if the guest level engine (or parent engine) detects an exception, it may simply complete its operation since a child engine must have already completed its operation successfully before the table fetch data for which it has actually been engaged, could be returned to the parent engine. So the child engine can complete independently. However completion of the parent engine depends on successful completion (i.e., no exception) of the child engine. Therefore, if the child engine detects an exception and just completes, the parent engine could hang. Addressing this issue, described herein is a process for how child exceptions in recursively operating engines could be reported to the parent engine via an extension of existing interfaces and protocols. FIG. 8 depicts an example address translation facility 600' of this, where the address translation facility 600 of FIG. 6 is repeated, and where the exception detected interface 800 and table fetch exception interface 810 discussed herein are illustrated.

As explained, for instance, with reference to FIG. 6 above, a translation request for one of the translation engine instances is received with all parameters needed to fully qualify the translation process (initial TO, memory relocation origin, etc.). This process works similarly for host level, as well as guest level address translations. Host level translations perform table fetches with host non-virtual addresses, such as host absolute addresses or host real addresses. In the case of guest level translations, the table fetches will be sent to the table cache as guest non-virtual addresses (or host virtual addresses). The table cache will perform a lookup operation in order to establish whether it has the required data already available (hit). If yes, then the table data will be returned to the requesting translation engine. If the table fetch does not hit in the table cache, then the data must be obtained through the cache/memory hierarchy, and a lookup request for translating the host virtual table fetch address to a host non-virtual address is sent to the TLB2/translation engine. If the lookup request does not hit in the TLB2, then another translation engine will be engaged to perform that address translation and the respective translation result will be written into TLB2. From there, the result can be retrieved by the table cache, which now has all required information available to complete the original table fetch based on the host virtual address. This process is transparent to the original guest level translation engine, also referred to as the parent engine, while the engine for the host virtual address translation for the guest level table fetch address may be designated as the child engine.

Should the child translation engine detect an exception, the child translation engine completes and reports the exception to the requestor, in this case the table cache (which may be implemented through the instruction cache), on the exception detected interface 800. The table cache is aware that this translation request was actually a child translation for resolving the table cache miss of the respective parent engine, and sends the exception condition back to the parent engine on the exception detected interface 810. As noted, these interfaces already exist for uncorrectable error (UE) and address not configured signals, and are enhanced in accordance with one or more aspects of the present invention, to add another code point representing the condition exception detected during child translation. When the parent engine detects this table fetch exception, it completes its operation and notifies the requestor that an exception has occurred.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 9:
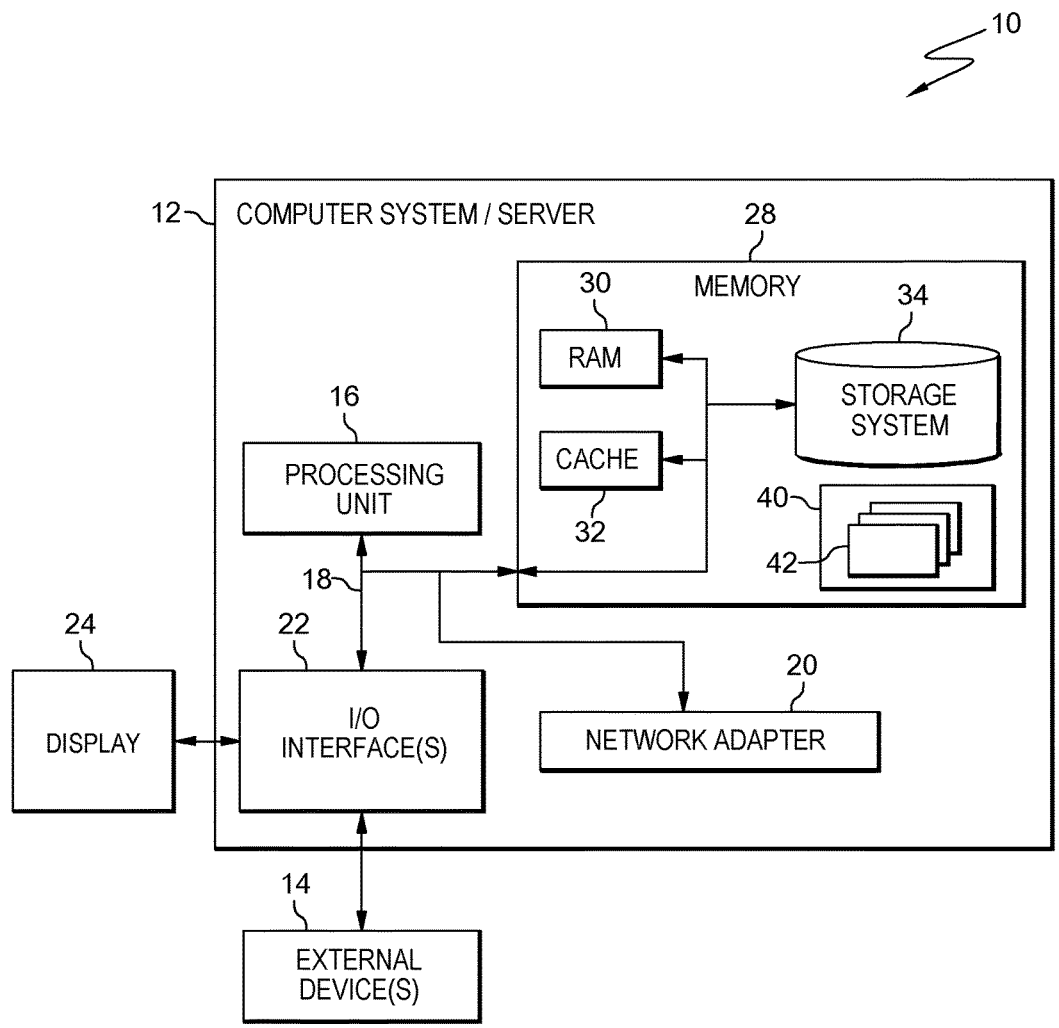
FIG. 9 depicts one embodiment of a cloud computing node.

Referring now to FIG. 9, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 10:
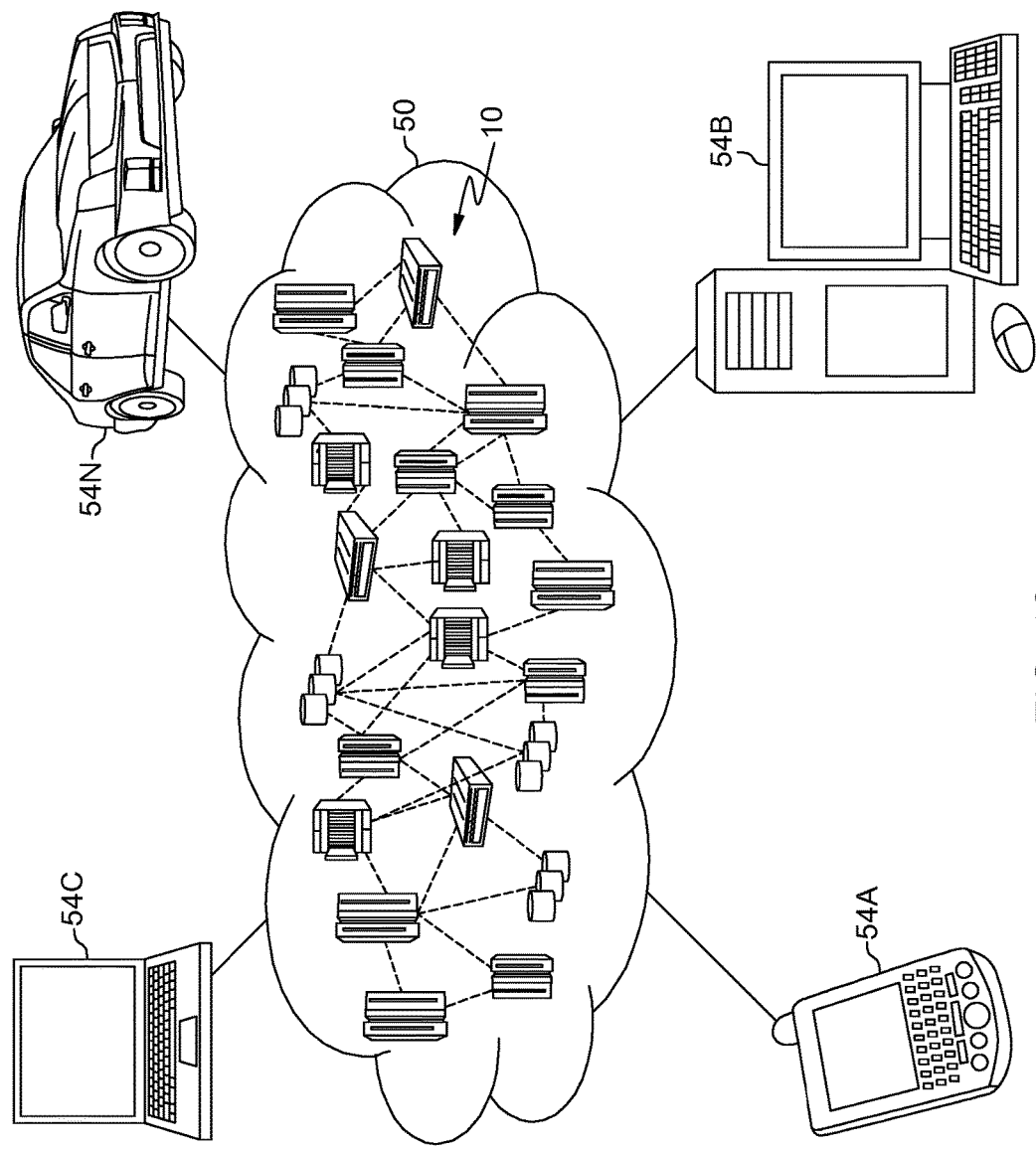
FIG. 10 depicts one embodiment of a cloud computing environment.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
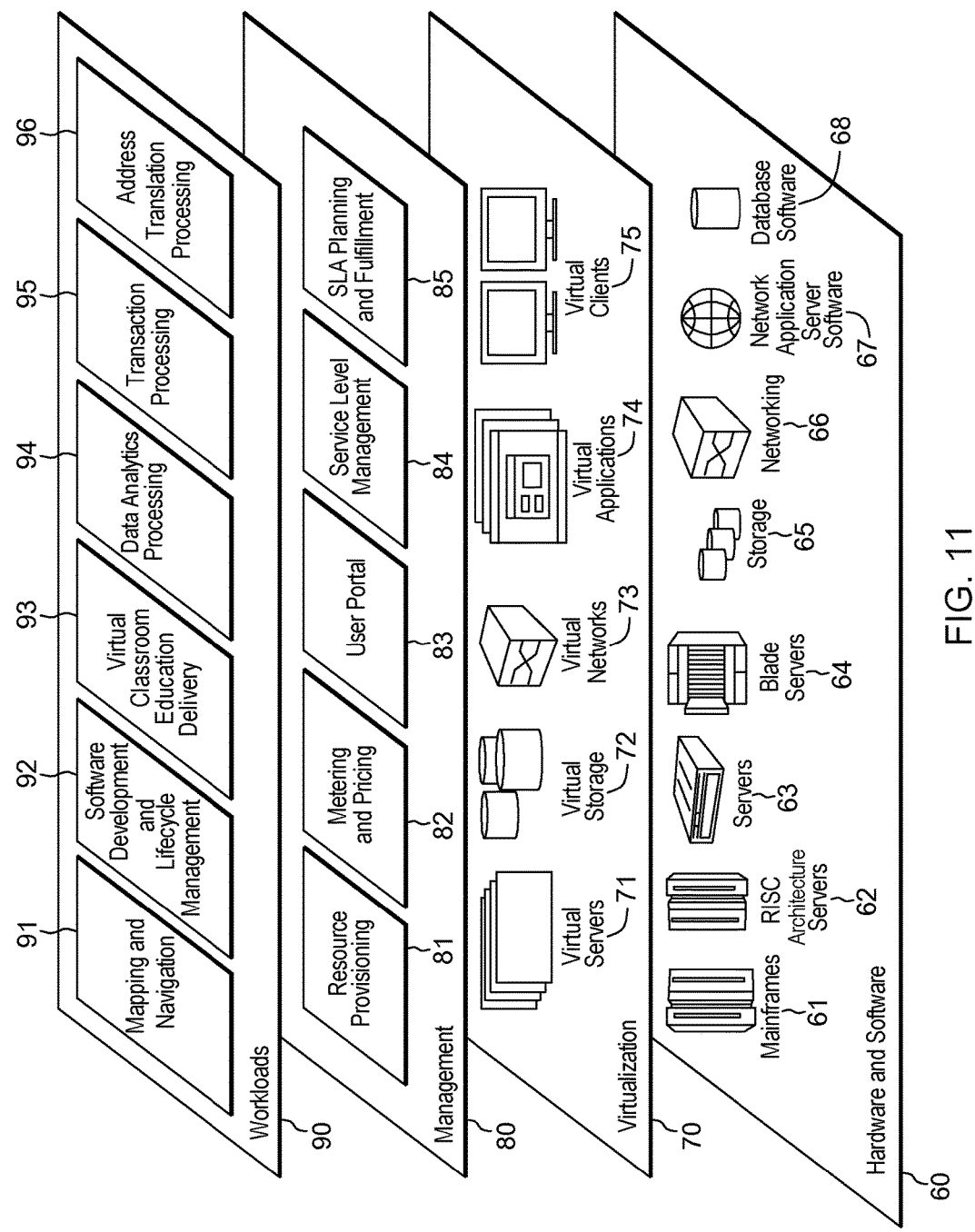
FIG. 11 depicts one example of abstraction model layers.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and address translation processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing in a computing environment, the computer program product comprising:
a computer readable storage medium readable by a processing circuit and storing instructions for execution by the processing circuit for performing a method comprising:
providing an address translation facility for multiple virtualization levels, wherein a guest virtual address may be translated to a guest non-virtual address, the guest non-virtual address corresponding without translation to a host virtual address, and the host virtual address may be translated to a host non-virtual address, where translation within a virtualization level is specified as a sequence of accesses to address translation tables, the providing comprising:
providing a first translation engine;
providing a second translation engine, wherein the first translation engine and the second translation engine each have capacity to perform address translation within a single virtualization level of the multiple virtualization levels, and wherein based on, in operation, the first translation engine performing a guest level translation, the second translation engine performs a host level translation of a resulting guest non-virtual address to a host non-virtual address based on the guest level translation by the first translation engine; and
wherein the address translation facility further comprises a table cache to receive table fetch requests from the first translation engine and the second translation engine, and wherein an exception detected by one of the first and second translation engines is propagated to the other of the first and second translation engines through the table cache as a table fetch exception.

2. The computer program product of claim 1, wherein based on the first translation engine performing the guest level translation, the second translation engine further performs a host level translation for the first translation engine of an access to a guest address translation table by the first translation engine.

3. The computer program product of claim 1, wherein based on the first translation engine performing the guest level translation, the second translation engine operates transparently to the first translation engine as a child translation engine of the first translation engine.

4. The computer program product of claim 1, wherein based on the first translation engine performing the guest level translation, one or more table fetches to a table cache are sent as guest non-virtual addresses, and based on a table fetch miss in the table cache, the address translation facility includes generating a lookup request for translation of a respective guest non-virtual address to a host non-virtual address, the lookup request being sent to a table lookaside buffer of the address translation facility for resolution.

5. The computer program product of claim 4, wherein the address translation facility further comprises engaging the second translation engine to perform the translating of the respective guest non-virtual address to the host non-virtual address based on the lookup request resulting in a table lookaside buffer miss.

6. The computer program product of claim 5, wherein the address translation facility further comprises writing a translation result of the second translation engine performing the translating of the respective guest non-virtual address to host non-virtual address to the table lookaside buffer, and respinning the lookup request to the table lookaside buffer.

7. The computer program product of claim 6, wherein the address translation facility further comprises resolving, based on the respinning, the lookup request using the translation result written to the table lookaside buffer, and writing the result for the translating of the respective guest non-virtual address to the host non-virtual address to the table cache, and returning the translation result to the first translation engine.

8. A computer program product for facilitating processing in a computing environment, the computer program product comprising:
a computer readable storage medium readable by a processing circuit and storing instructions for execution by the processing circuit for performing a method comprising:
providing an address translation facility for multiple virtualization levels, wherein a guest virtual address may be translated to a guest non-virtual address, the guest non-virtual address corresponding without translation to a host virtual address, and the host virtual address may be translated to a host non-virtual address, where translation within a virtualization level is specified as a sequence of accesses to address translation tables, the providing comprising:
providing a first translation engine;
providing a second translation engine, wherein the first translation engine and the second translation engine each have capacity to perform address translation within a single virtualization level of the multiple virtualization levels, and wherein based on, in operation, the first translation engine performing a guest level translation, the second translation engine performs a host level translation of a resulting guest non-virtual address to a host non-virtual address based on the guest level translation by the first translation engine; and wherein the first translation engine and the second translation engine are identical translation engines and either identical translation engine may perform the guest level translation or the host level translation in operation.

9. A computer system for facilitating processing in a computing environment, the computer system comprising:

a memory; and a physical processor in communication with a memory, wherein the computer system is configured to perform a method, the method comprising:

providing an address translation facility for multiple virtualization levels, wherein a guest virtual address may be translated to a guest non-virtual address, the guest non-virtual address corresponding without translation to a host virtual address, and the host virtual address may be translated to a host non-virtual address, where translation within a virtualization level is specified as a sequence of accesses to address translation tables, the providing comprising:

providing a first translation engine;

providing a second translation engine, wherein the first translation engine and the second translation engine each have capacity to perform address translation within a single virtualization level of the multiple virtualization levels, and wherein based on, in operation, the first translation engine performing a guest level translation, the second translation engine performs a host level translation of a resulting guest non-virtual address to a host non-virtual address based on the guest level translation by the first translation engine; and wherein the address translation facility further comprises a table cache to receive table fetch requests from the first translation engine and the second translation engine, and wherein an exception detected by one of the first and second translation engines is propagated to the other of the first and second translation engines through the table cache as a table fetch exception.

10. The computer system of claim 9, wherein where the first translation engine performs the guest level translation, the second translation engine further performs a host level translation for the first translation engine of an access to a guest address translation table by the first translation engine.

11. The computer system of claim 9, wherein based on the first translation engine performing the guest level translation, the second translation engine operates transparently to the first translation engine as a child translation engine of the first translation engine.

12. The computer system of claim 9, wherein based on the first translation engine performing the guest level translation, one or more table fetches to a table cache are sent as guest non-virtual addresses, and based on a table fetch miss in the table cache, the address translation facility includes generating a lookup request for translation of a respective guest non-virtual address to a host non-virtual address, the lookup request being sent to a table lookaside buffer of the address translation facility for resolution.

13. The computer system of claim 12, wherein the address translation facility further comprises engaging the second translation engine to perform the translating of the respective guest non-virtual address to the host non-virtual address based on the lookup request resulting in a table lookaside buffer miss.

14. The computer system of claim 13, wherein the address translation facility further comprises writing a translation result of the second translation engine performing the translating of the respective guest non-virtual address to host non-virtual address to the table lookaside buffer, and respinning the lookup request to the table lookaside buffer, wherein the address translation facility further comprises resolving, based on the respinning, the lookup request using the translation result written to the table lookaside buffer, and writing the result for the translating of the respective guest non-virtual address to the host non-virtual address to the table cache, and returning the translation result to the first translation engine.

* * * * *